(12) United States Patent
Kondylis

(10) Patent No.: US 8,194,810 B2
(45) Date of Patent: Jun. 5, 2012

(54) CYCLIC DELAY DIVERSITY IN A WIRELESS SYSTEM

(75) Inventor: George Kondylis, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 12/900,823

(22) Filed: Oct. 8, 2010

(65) Prior Publication Data

US 2011/0026641 A1  Feb. 3, 2011

Related U.S. Application Data

(63) Continuation of application No. 11/589,924, filed on Oct. 31, 2006, now Pat. No. 7,813,448.

(60) Provisional application No. 60/731,490, filed on Oct. 31, 2005.

(51) Int. Cl.
*H04B 7/10* (2006.01)
(52) U.S. Cl. ........................................ 375/347; 375/349
(58) Field of Classification Search .................. 375/347, 375/349, 299, 130, 135, 147–148
See application file for complete search history.

(56) References Cited

U.S. PATENT DOCUMENTS

| 5,926,503 | A | * | 7/1999 | Kelton et al. .................. 375/148 |
| 6,029,056 | A | * | 2/2000 | Kiyanagi et al. ............ 455/276.1 |
| 6,229,840 | B1 | * | 5/2001 | Ichihara ........................ 375/147 |
| 6,645,146 | B1 | * | 11/2003 | Adams et al. ................. 600/443 |
| 7,813,448 | B2 | | 10/2010 | Kondylis |
| 2002/0003774 | A1 | | 1/2002 | Wang et al. |
| 2003/0036359 | A1 | * | 2/2003 | Dent et al. ...................... 455/63 |
| 2003/0043776 | A1 | * | 3/2003 | Lomp et al. .................... 370/342 |
| 2003/0128675 | A1 | | 7/2003 | Kuo |
| 2005/0026566 | A1 | | 2/2005 | Dabak et al. |
| 2005/0216950 | A1 | * | 9/2005 | MacInnis ....................... 725/135 |
| 2005/0271157 | A1 | * | 12/2005 | van Zelst et al. ............. 375/267 |
| 2006/0034163 | A1 | | 2/2006 | Gore et al. |
| 2006/0035673 | A1 | * | 2/2006 | Choi ............................. 455/561 |
| 2007/0008946 | A1 | | 1/2007 | Kim |
| 2008/0064408 | A1 | | 3/2008 | Lindoff |
| 2008/0069256 | A1 | * | 3/2008 | Lakkis .......................... 375/260 |
| 2010/0080314 | A9 | * | 4/2010 | van Rooyen ................. 375/267 |

* cited by examiner

*Primary Examiner* — Emmanuel Bayard
(74) *Attorney, Agent, or Firm* — Sterne, Kessler, Goldstein & Fox PLLC

(57) ABSTRACT

A system includes a first transmitter, a second transmitter, and a legacy receiver. The first transmitter transmits information via a first channel to the legacy receiver. The second transmitter transmits a time-shifted version of the information via a second channel to the legacy receiver. The legacy receiver combines the information received via the first channel and the time-shifted information received via the second channel to provide combined information. The legacy receiver processes the combined information as though it is received via a single channel.

18 Claims, 12 Drawing Sheets

CYCLIC DELAY DIVERSITY IN A WIRELESS SYSTEM

CROSS-REFERENCE TO RELATED APPLICATION

This application is a continuation of U.S. application Ser. No. 11/589,924, filed Oct. 31, 2006, now allowed as U.S. Pat. No. 7,813,448, titled "Cyclic Delay Diversity in a Wireless System", which claims the benefit of U.S. Provisional Patent Application No. 60/731,490, filed Oct. 31, 2005, both of which are incorporated herein by reference in their entireties.

BACKGROUND OF THE INVENTION

1. Field of the Invention

The present invention generally relates to wireless systems, and more specifically to techniques for providing diversity in a wireless system.

2. Background

Diversity is the use of multiple versions of a signal in a system.

Diversity typically improves the performance of the system because another version of the signal is available if a first version encounters a problem. Multiple versions of the signal can be provided by hardware and/or software, for example. Digital signal processing (DSP) techniques are often employed to provide the multiple versions. Wireless communication systems in particular can employ and take advantage of various types of diversity. Some examples are temporal diversity, whereby the system utilizes different copies of the signal in time, and frequency diversity, whereby the system utilizes different copies of the signal in frequency. For a wireless communication system that employs multiple antennas, spatial diversity can also be utilized by the system, whereby different copies of the signal are present on each antenna.

Conventional wireless systems, such as those based on the Institute of Electrical and Electronics Engineers (IEEE) 802.11 standard (hereinafter referred to as "legacy wireless systems"), either are not designed to have spatial diversity or can only use spatial diversity in a limited manner. A legacy wireless system, for example, includes a single transmitter and a single receiver. The transmitter encodes data before transmitting the data, and the receiver decodes the encoded data for further processing. If the receiver has only a single antenna then it cannot benefit from spatial diversity. If it has multiple receive antennas, it can employ some suboptimal algorithm to choose the antenna having the highest receive power, e.g., in order to enhance the received signal strength. Similarly, if the transmitter has only one antenna it cannot use spatial diversity. If it has multiple transmit antennas it can employ some suboptimal algorithm that chooses one of the antennas based, e.g., on the result of previous receptions on that antenna Some modern wireless systems include multiple transmitters to improve the transmission rate, the range, and/or the reliability of the wireless system. For instance, a proposed IEEE wireless local area network (WLAN) standard, IEEE 802.11n, allows a transmission rate of up to 130 Mbps in 20 MHz bandwidth by utilizing two transmitters. The proposed standard at least doubles the transmission rates achievable using other WLAN standards. For example, IEEE 802.11a and IEEE 802.11g each support a transmission rate of up to 54 Mbps.

Example wireless systems having multiple transmitters include multiple input, single output (MISO) systems and multiple input, multiple output (MIMO) systems. In a MISO system, multiple transmitters transmit data to a single receiver. In a MIMO system, multiple transmitters transmit data to multiple receivers.

In a conventional MISO or MIMO system, different transmitters transmit different data. If two or more transmitters in a conventional MISO or MIMO system transmit the same data, then the energy transmitted by each transmitter cancels the energy transmitted by the other transmitter(s) at locations that are based on the distance between the respective transmitters.

What is needed is a method, system, and/or computer program product that addresses one or more of the aforementioned shortcomings of conventional wireless systems having multiple transmitters.

BRIEF SUMMARY OF THE INVENTION

The present invention provides a method and system to provide or enhance diversity in a system. In particular, an embodiment of the present invention provides cyclic delay diversity in a wireless system, wherein a plurality of transmitters transmit information such that a legacy receiver is capable of processing the information received from the plurality of transmitters.

In an embodiment, a system includes a first transmitter, a second transmitter, and a legacy receiver. The first transmitter transmits first information via a first channel. The second transmitter transmits time-shifted first information via a second channel. The legacy receiver is capable of processing the first information and the time-shifted first information as though the first information and the time-shifted first information are received via a single channel. For instance, the legacy receiver can treat the first channel and the second channel as a combined, single channel.

According to an embodiment, the first transmitter transmits the first information and the second transmitter transmits the time-shifted first information in accordance with a standard, such as an Institute of Electrical and Electronics Engineers (IEEE) 802.11a standard, an IEEE 802.11b standard, an IEEE 802.11g standard, or an IEEE 802.11n standard.

In another embodiment, the legacy receiver determines/estimates the single channel based on second information received from the first transmitter and time-shifted second information received from the second transmitter. The first information can be a data portion of an orthogonal frequency division multiplexing (OFDM) frame, and the second information can be a preamble portion of the OFDM frame. The legacy receiver may utilize an error minimization algorithm to determine the single channel.

In yet another embodiment, the second transmitter reduces the delay associated with the time-shifted first or second information until the legacy receiver is capable of determining/estimating the single channel. The second transmitter can transmit the time-shifted first or second using a predetermined maximum delay. If legacy receiver is not capable of determining/estimating the channel, then the second transmitter can reduce the delay and re-transmit the time-shifted first or second information using the reduced delay. The second transmitter can continue to reduce the delay and re-transmit the tine-shifted first or second information so long as the legacy receiver is not capable of determining/estimating the channel.

The delay associated with the time-shifted first or second information may be programmable. The system can include a memory to store the delay associated with the time-shifted first or second information.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the pertinent art(s) to make and use the invention. In the drawings, like reference numbers indicate identical or functionally similar elements. Additionally, the leftmost digit(s) of a reference number identifies the drawing in which the reference number first appears.

DETAILED DESCRIPTION OF THE INVENTION

This specification discloses one or more embodiments that incorporate the features of this invention. The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to effect such feature, structure, or characteristic in connection with other embodiments whether or not explicitly described.

1.0 Overview

Figure 1:
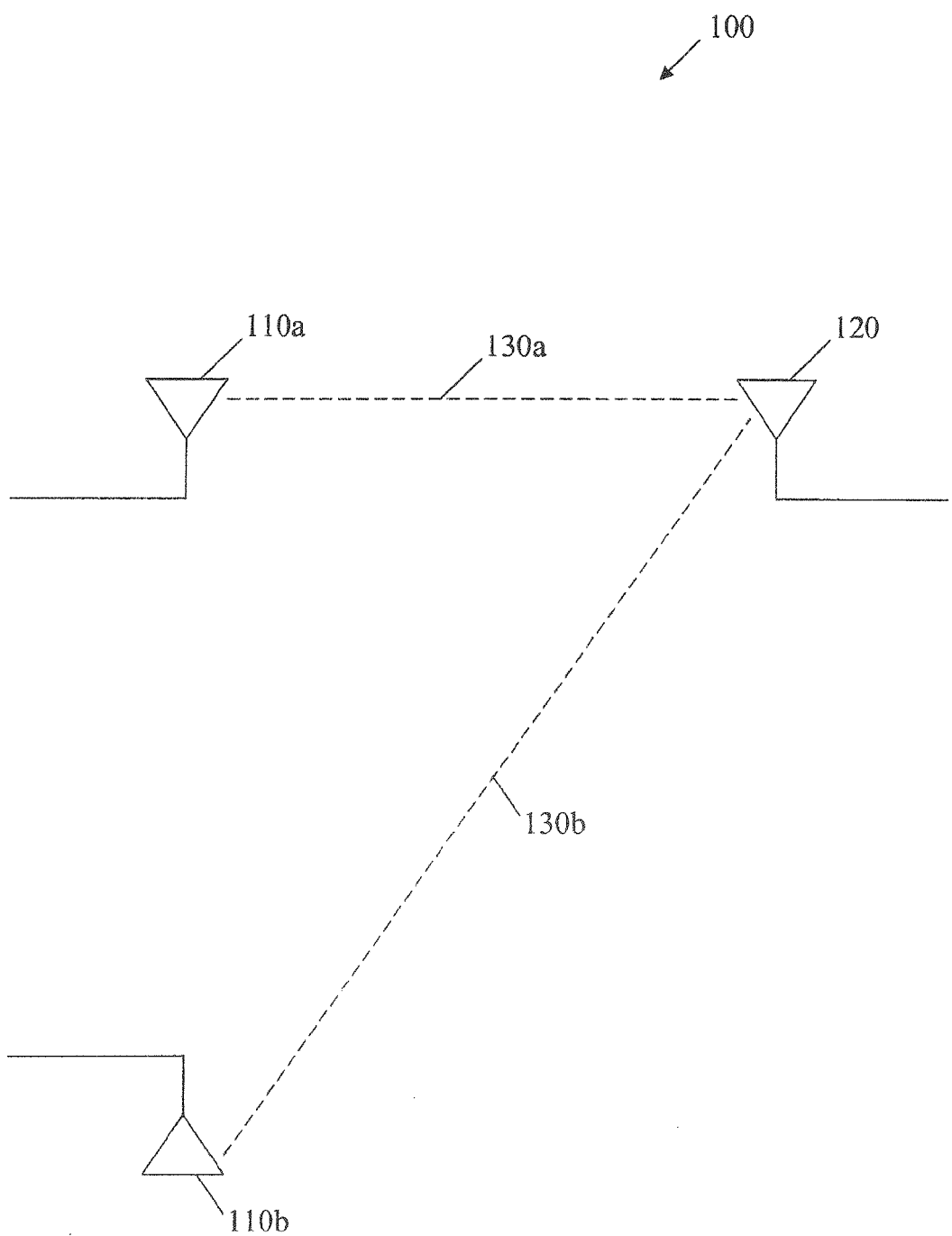
FIG. 1 illustrates an example system having multiple transmitters according to an embodiment of the present invention.

FIG. 1 illustrates an example system 100 having multiple transmitters according to an embodiment of the present invention. System 100 includes first transmitter 110a, second transmitter 110b, a legacy receiver 120, and channels 130a-b. First transmitter 110a transmits information via channel 130a to legacy receiver 120. Second transmitter 110b transmits a time-delayed version of the information via channel 130b to legacy receiver 120. Legacy receiver 120 combines the information received via channel 110a and the time-delayed information received via channel 110b to provide combined information. Legacy receiver 120 processes the combined information as though it is received from a single channel.

In an embodiment, first transmitter 110a encodes the information before transmitting the information to legacy receiver 120, and second transmitter 110b encodes the time-delayed information before transmitting the time-delayed information to legacy receiver 120. Legacy receiver 120 decodes the information received from first transmitter 110a and the time-delayed information received from second transmitter 110b.

According to another embodiment, legacy receiver 120 decodes the information and the time-delayed information before combining the information and the time-delayed information to provide the combined information. In another embodiment, legacy receiver 120 combines the information and the time-delayed information before decoding the information and the time-delayed information.

System 100 can include a memory to store a delay that is based on legacy receiver 120. For instance, transmitter 110b may predetermine an appropriate delay to be used with respect to legacy receiver 120. According to an embodiment, transmitter 110b reads the delay from the memory and transmits the time-delayed information based on the delay.

Transmitter 110a may include a first antenna, and transmitter 110b may include a second antenna, as depicted in FIG. 1, though the scope of the present invention is not limited in this respect. System 100 may further include a tapped delay line to delay the information for transmission by transmitter 110b.

According to an embodiment, channels 130a-b represent paths through which information is transmitted by transmitters 110a-b, respectively, to legacy receiver 120. Channels 130a-b can be figurative or actual paths.

Figure 6:
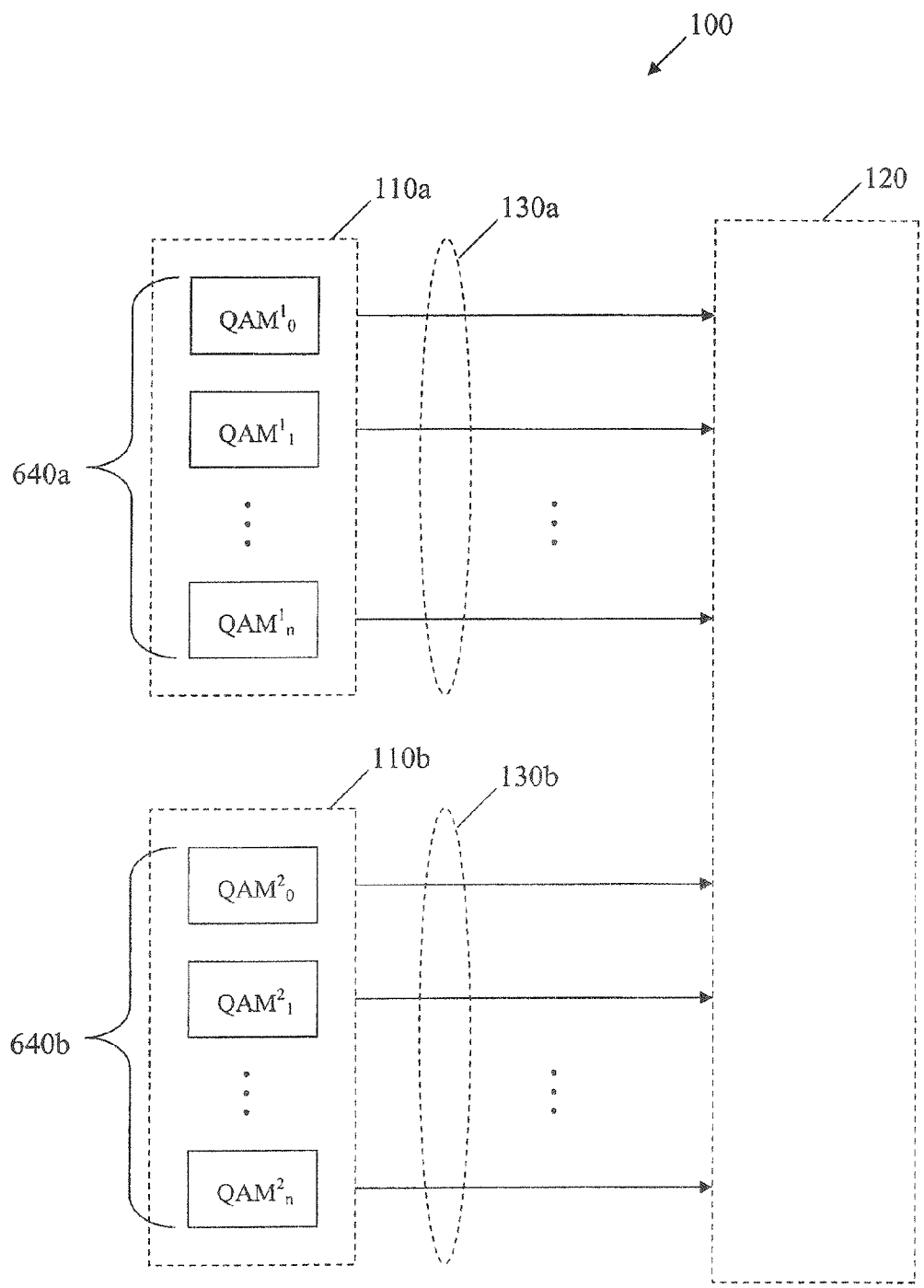
FIG. 6 illustrates the example system shown in FIG. 1 according to another embodiment of the present invention.

FIG. 6 illustrates example system 100 according to another embodiment of the present invention. In FIG. 6, transmitters 110a and 110b include quadrature amplitude modulators (QAMs) 640a and 640b, respectively. FIG. 6 will be described with reference to transmitter 110a, QAMs 640a, and channel 130a for simplicity, though persons skilled in the art(s) will recognize that the discussion is similarly applicable to transmitter 110b, QAMs 640b, and channel 130b.

Referring to FIG. 6, QAMs 640a modulate samples of information based on a clock signal generated by or received by respective transmitter 110a. In FIG. 6, QAMs 640a can be any type of modulator and need not necessarily be QAMs. It will be apparent to persons skilled in the art(s) that samples of information can be modulated using any of a variety of modulators in system 100.

For a given time period (e.g., an orthogonal frequency division multiplexing (OFDM) symbol time) QAMs 640a simultaneously modulate a sample of information, with each of the QAMs 640a operating at a different sub-carrier. QAMs 640a thereby provide a plurality of modulated samples, based on the sample that is processed by each of QAMs 640a. Transmitter 110a transmits the modulated samples to legacy receiver 120.

Figure 2:
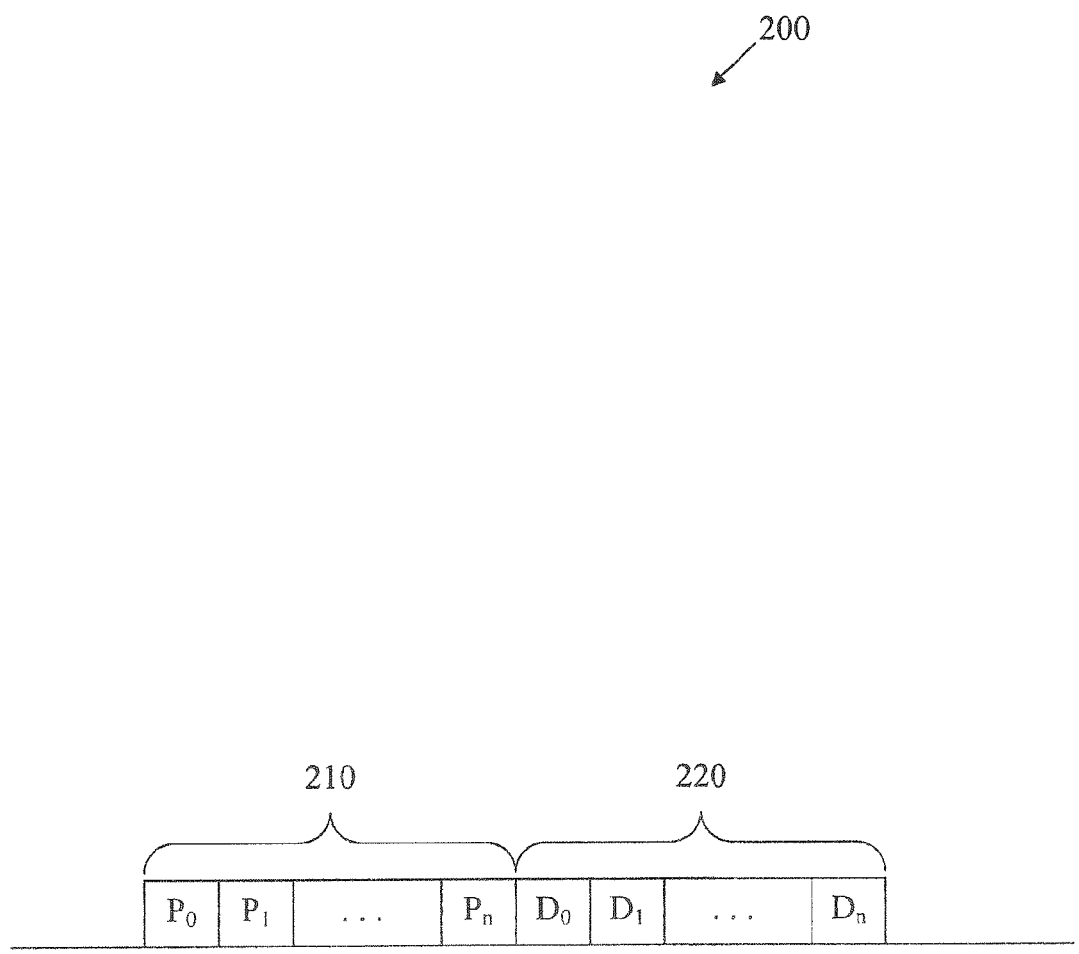
FIG. 2 illustrates a frame having a preamble portion and a data portion according to an embodiment of the present invention.

In system 100, information is transmitted in frames. FIG. 2 illustrates a frame 200 according to an embodiment of the present invention. Frame 200 includes a preamble portion 210 and a data portion 210. Preamble portion 210 and data portion 220 each include multiple modulated samples $P_0$-$P_n$ and $D_0$-$D_n$, respectively. The number of modulated samples, n+1, is based on the number of QAMs in transmitter 110a or 110b that are transmitting information to legacy receiver 120. A modulated sample is transmitted by each QAM of the respective transmitter 110a or 110b. The number of modulated samples in preamble portion 210 or data portion 220 equals the number of QAMs.

Legacy receiver 120 uses preamble portion 210 to determine/estimate a channel via which frame 200 is received. The channel can be determined using a time domain technique, a frequency domain technique, any other suitable technique that allows for determination or estimation of the channel, or any combination thereof. According to an embodiment, an error minimization algorithm is employed to improve the channel estimation error performance of a technique.

Once legacy receiver 120 determines/estimates the channel, legacy receiver 120 is able to process data portion 220 of frame 200. Thus, legacy receiver 120 processes preamble portion 210 before processing data portion 220.

2.0 Transmission via a Single Channel

Figure 3:
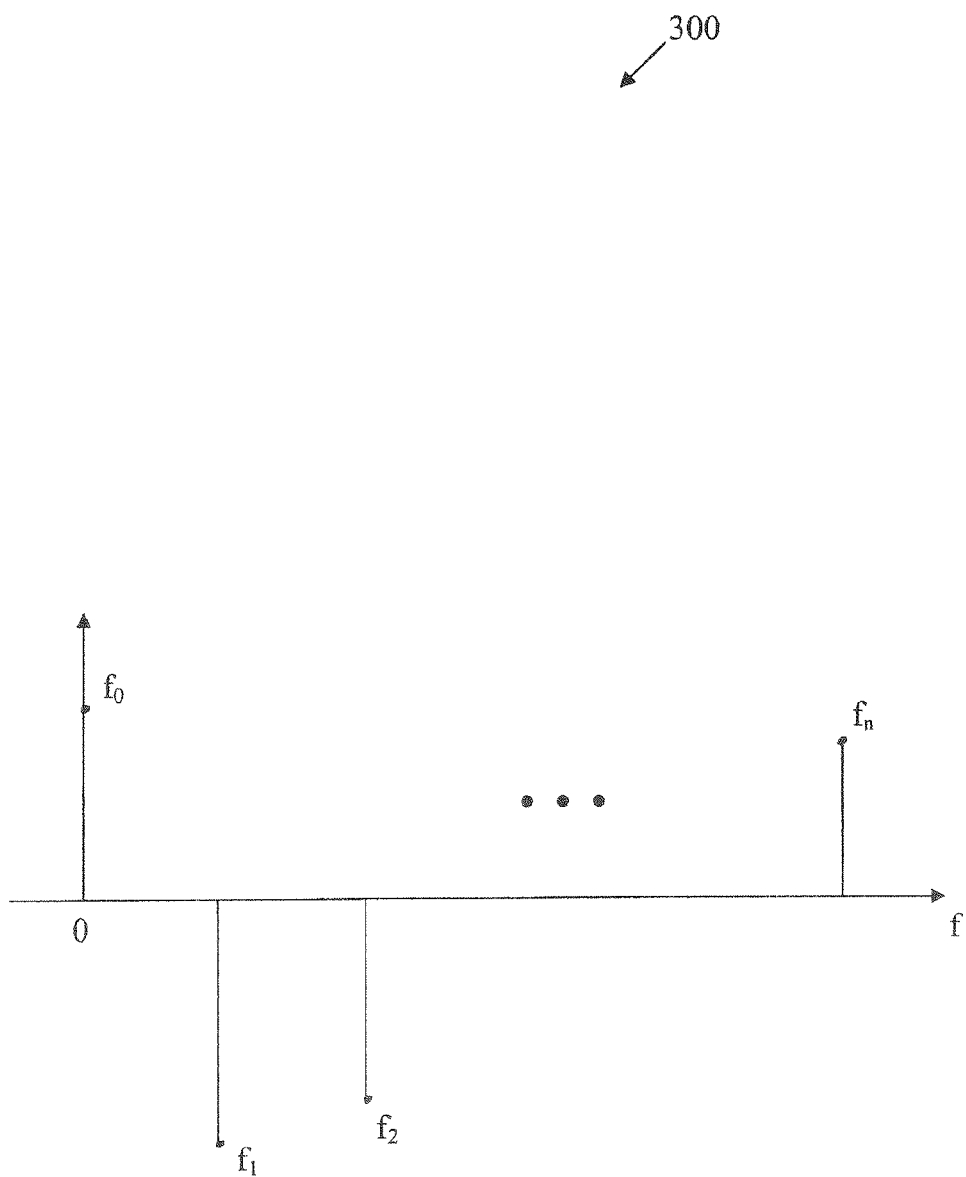
FIG. 3 illustrates sub-carriers in the frequency domain corresponding to modulated samples of the preamble portion or the data portion shown in FIG. 2 according to an embodiment of the present invention.
Figure 4:
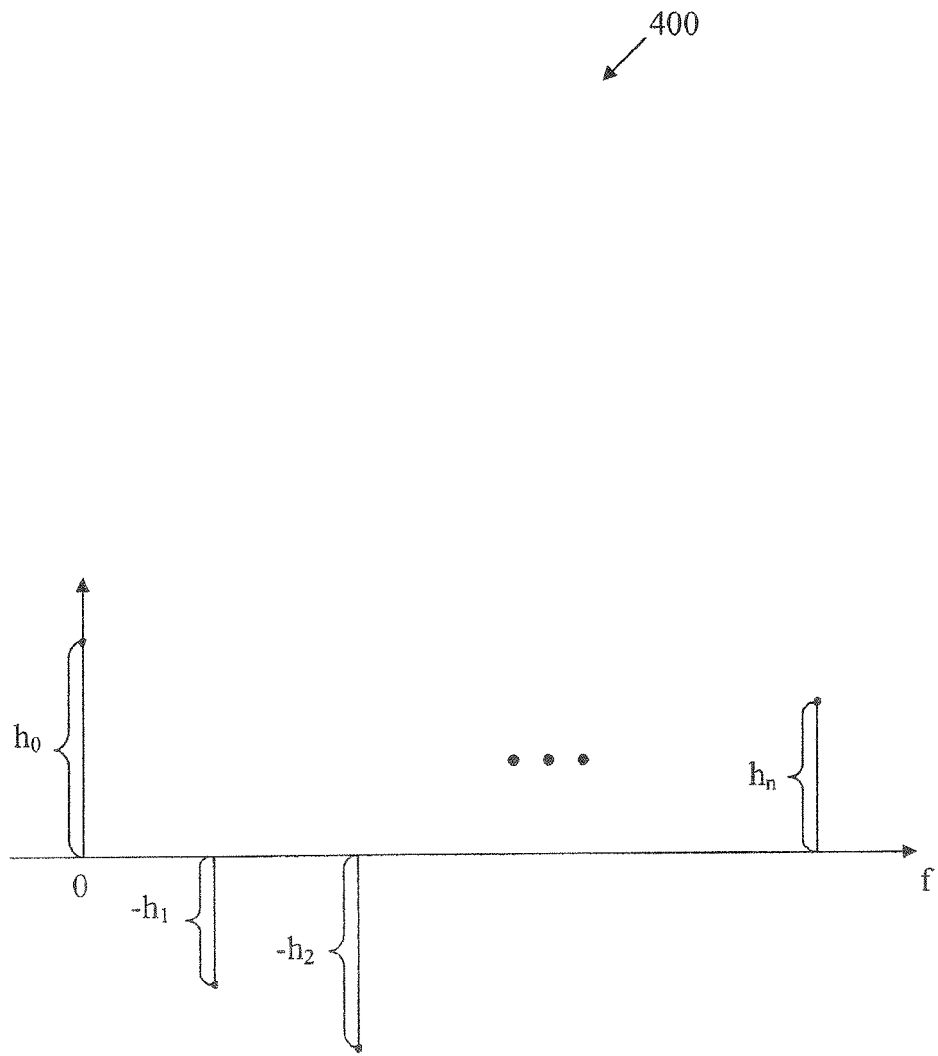
FIG. 4 illustrates the sub-carriers of FIG. 3 multiplied by respective channel coefficients according to an embodiment of the present invention.

FIGS. 3 and 4 provide a frequency domain representation of samples, such as modulated preamble samples $P_0$-$P_n$ of preamble portion 210 or modulated data samples $D_0$-$D_n$ of data portion 220 shown in FIG. 2 according to embodiments of the present invention. FIGS. 3 and 4 are described with respect to a single channel for simplicity. This discussion is expanded in section 3.0 below to show the frequency domain relationship between multiple channels.

FIG. 3 illustrates sub-carriers $f_0$-$f_n$ in the frequency domain corresponding to modulated preamble samples $P_0$-$P_n$ of preamble portion 210 or modulated data samples $D_0$-$D_n$ of data portion 220 according to an embodiment of the present invention. In FIG. 3, each sub-carrier $f_0$-$f_n$ carries one respective modulated sample $P_0$-$P_n$ or $D_0$-$D_n$ of information. Each sub-carrier $f_0$-$f_n$ represents a complex number whose value depends on the modulated data, based on a standard associated with frame 200. The standard may be a cellular, wireless metropolitan area network (WMAN), wireless local area network (WLAN), wireless personal area network (WPAN), or wireless fidelity (Wi-Fi) standard, or any other wireless standard.

The combination of sub-carriers $f_0$-$f_n$ corresponding to modulated samples $P_0$-$P_n$ or $D_0$-$D_n$ is referred to as frequency content 300 of preamble portion 210 or data portion 220, respectively. Frequency content 300 of preamble portion 210 is said to be semi-random, because each standard specifies certain sub-carriers of preamble portion 210 to be negative to more closely resemble a random pattern. For instance, sub-carriers $f_1$ and $f_2$ are shown to be negative in FIG. 3 for illustrative purposes. The inclusion of negative sub-carriers reduces the number and/or magnitude of peaks in the time domain signal corresponding to modulated samples $P_0$-$P_n$.

Because preamble portion 210 is used for channel estimation, setting the magnitude of $f_0$-$f_n$ to be plus or minus one helps to reduce the complexity of the channel estimator at the receiver. In the embodiment of FIG. 3, legacy receiver 120 determines/estimates the channel via which modulated samples $P_0$-$P_n$ or $D_0$-$D_n$ are received based on the combination of positive and negative ones representing frequency content 300 of preamble portion 210.

Transmitters 110a-b and legacy receiver 120 usually are not optimized for the current conditions of a channel, because the channel changes with time. Some modulated samples $P_0$-$P_n$ or $D_0$-$D_n$ may have a greater magnitude than others. As shown in FIG. 4, each sub-carrier $f_0$-$f_n$ is multiplied by a respective channel coefficient $h_0$-$h_n$ according to an embodiment of the present invention. The magnitudes of channel coefficients $h_0$-$h_n$ shown in FIG. 4 are provided for illustrative purposes only, and are not intended to limit the scope of the present invention. The magnitudes of channel coefficients $h_0$-$h_n$ depend on characteristics of the channel. According to an embodiment, legacy receiver 120 performs a transform, such as a fast Fourier transform (FFT) on modulated samples $P_0$-$P_n$ or $D_0$-$D_n$ to provide sub-carriers $f_0$-$f_n$ that are multiplied by respective channel coefficients, as illustrated in FIG. 4.

Because channel coefficients $h_0$-$h_n$ are completely random, some of the channel coefficients $h_0$-$h_n$ are small (e.g., $h_1$) as compared to the other channel coefficients $h_0$-$h_n$. When a sub-carrier $f_0$-$f_n$ having a small channel coefficient $h_0$-$h_n$ is received by legacy receiver 120, the noise in system 100 can interfere and/or prevent reception of the sub-carrier $f_0$-$f_n$. If legacy receiver 120 cannot adequately process a sub-carrier $f_0$-$f_n$, an error occurs on the sub-carrier.

Referring to FIG. 4, each sub-carrier $f_0$-$f_n$ has only one channel coefficient $h_0$-$h_n$ because frame 200 is transmitted via a single channel. If the channel is small for a sub-carrier $f_0$-$f_n$, then frame 200 may be lost, assuming that error correcting code is not capable of recovering frame 200.

3.0 Transmission via Multiple Channels

Figure 5:
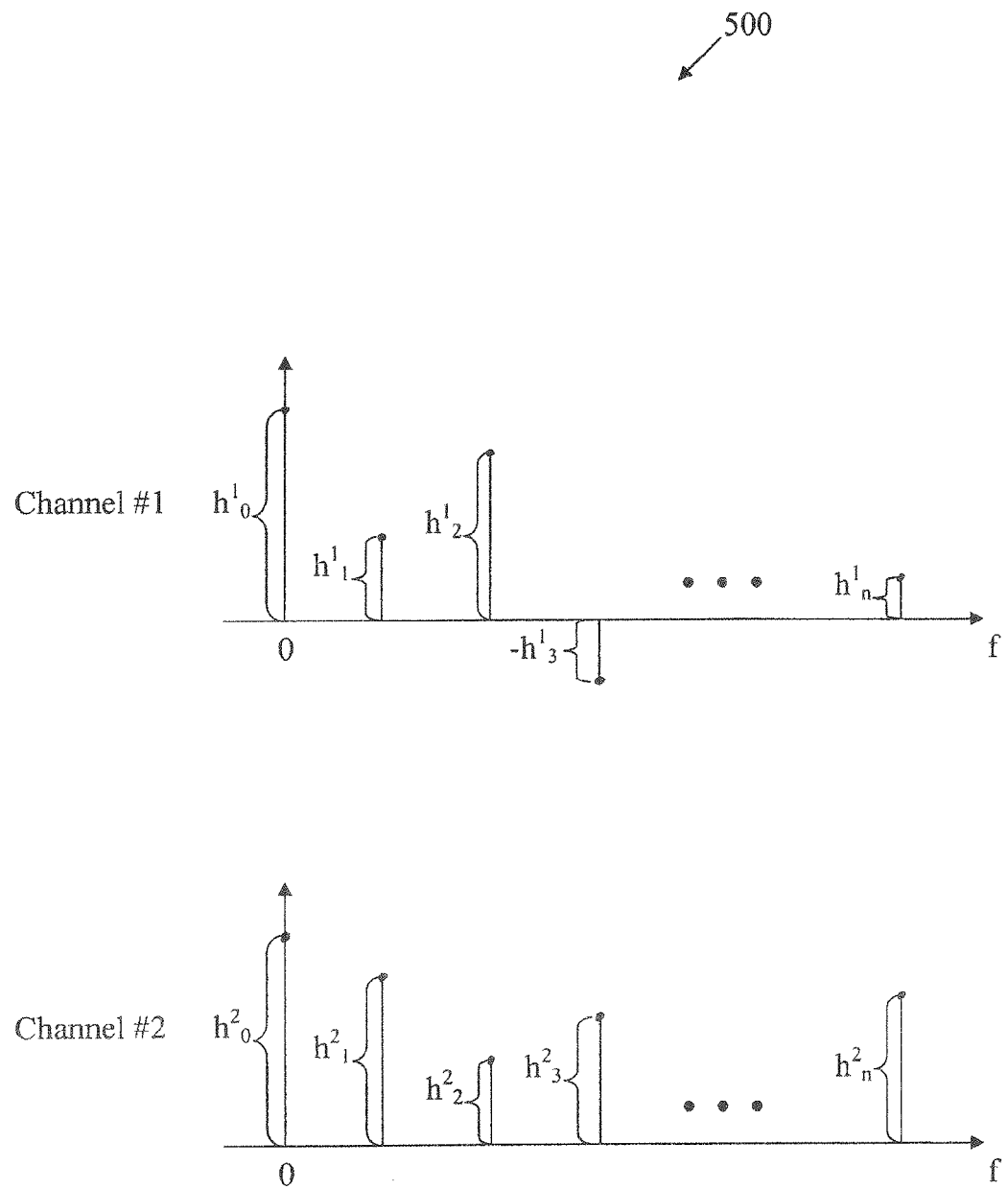
FIG. 5 illustrates two sets of channel coefficients, each of which corresponds to a different channel, according to an embodiment of the present invention.

FIG. 5 illustrates two sets of channel coefficients $h^1_0$-$h^1_n$ and $h^2_0$-$h^2_n$, each of which corresponds to a different channel, according to an embodiment of the present invention. For example, channel coefficients $h^1_0$-$h^1_n$ and $h^2_0$-$h^2_n$ can correspond to channels 130a and 130b, respectively, in FIG. 1. Each channel operates independently from the other channel (s). Thus, channel coefficients $h^1_0$-$h^1_n$ are independent of channel coefficients $h^2_0$-$h^2_n$. Corresponding channel coefficients $h^1_0$-$h^1_n$ and $h^2_0$-$h^2_n$ are likely to be different at any given time. If a channel coefficient associated with one of the channels is relatively small, the channel coefficient associated with the other channel may be larger. If these two channel coefficients are combined, then the frame is less likely to be lost. Legacy receiver 120 combines channel coefficients $h^1_0$-$h^1_n$ and $h^2_0$-$h^2_n$ to provide combined channel coefficients for processing.

If the same information is transmitted via multiple channels of a system, then lobes are created, such that channel coefficients $h^1_0$-$h^1_n$ and/or $h^2_0$-$h^2_n$ are equal to zero at points in space that depend on the configuration of the system. The system can utilize cyclic delay diversity to mitigate this effect.

Cyclic delay diversity is achieved by transmitting multiple versions of the same information using multiple transmitters, such as transmitters 110a-b in FIG. 1. At least one version of the information is cyclically shifted with respect to another version.

Figure 7:
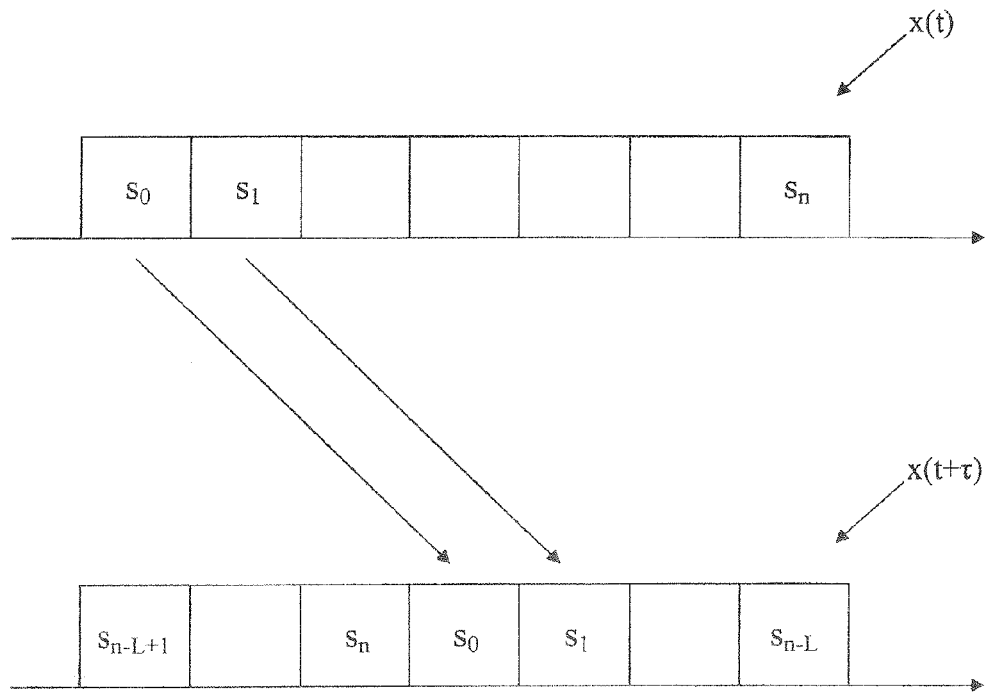
FIG. 7 illustrates cyclic shifting of samples of an orthogonal frequency division multiplexing (OFDM) symbol according to an embodiment of the present invention.

Referring to FIG. 7, samples $s_0$-$s_n$ of an orthogonal frequency division multiplexing (OFDM) symbol are cyclically shifted according to an embodiment of the present invention. Samples $s_0$-$s_n$ can be samples $P_0$-$P_n$ of preamble portion 210 or samples $D_0$-$D_n$ of data portion 220 of FIG. 2, to provide some examples. Transmitter 110a transmits a first version of the OFDM symbol in accordance with a function x(t). Transmitter 110b transmits a second version of the OFDM symbol in accordance with a function x(t+τ). The second version includes the same samples $s_0$-$s_n$ as the first version, though the second version is time-shifted with respect to the first version. The time shift is represented by the variable, τ, and is illustrated in FIG. 7.

Each sample of x(t+τ) is shifted in time by a number of samples L that corresponds to the time delay, τ. The time delay can be represented by the following equation:

$$\tau = L \cdot dt \quad \text{(Equation 1)}$$

where dt is the time necessary for transmitter 110a or 110b to transmit one sample.

In the embodiment of FIG. 7, seven samples $s_0$-$s_n$ are transmitted by each transmitter 110a-b, and samples $s_0$-$s_n$ transmitted by transmitter 110b are shifted by three samples in the time domain with respect to samples $s_0$-$s_n$ transmitted by transmitter 110a. Thus, in the embodiment of FIG. 7, n=6 and L=3. In this embodiment, the time delay, τ, is equivalent to the time necessary for transmitter 110a or 110b to transmit three samples.

As shown in FIG. 7, the shifting operation can be performed such that samples $s_0$-$s_n$ of the OFDM symbol are rotated in a time frame of the OFDM symbol on a first-in-first-out basis. In other words, as samples of the OFDM symbol are shifted beyond the time frame of the OFDM symbol, those samples are re-directed to the beginning of the time frame. As a sample is shifted from the end of the time frame to the beginning of the time frame, all other samples in the time frame are shifted a time equivalent to dt.

According to an embodiment, the time delay, τ, is programmable. For instance, the time delay, τ, can be based on the ability of legacy receiver 120 to process a signal that includes time shifted samples.

Figure 8:
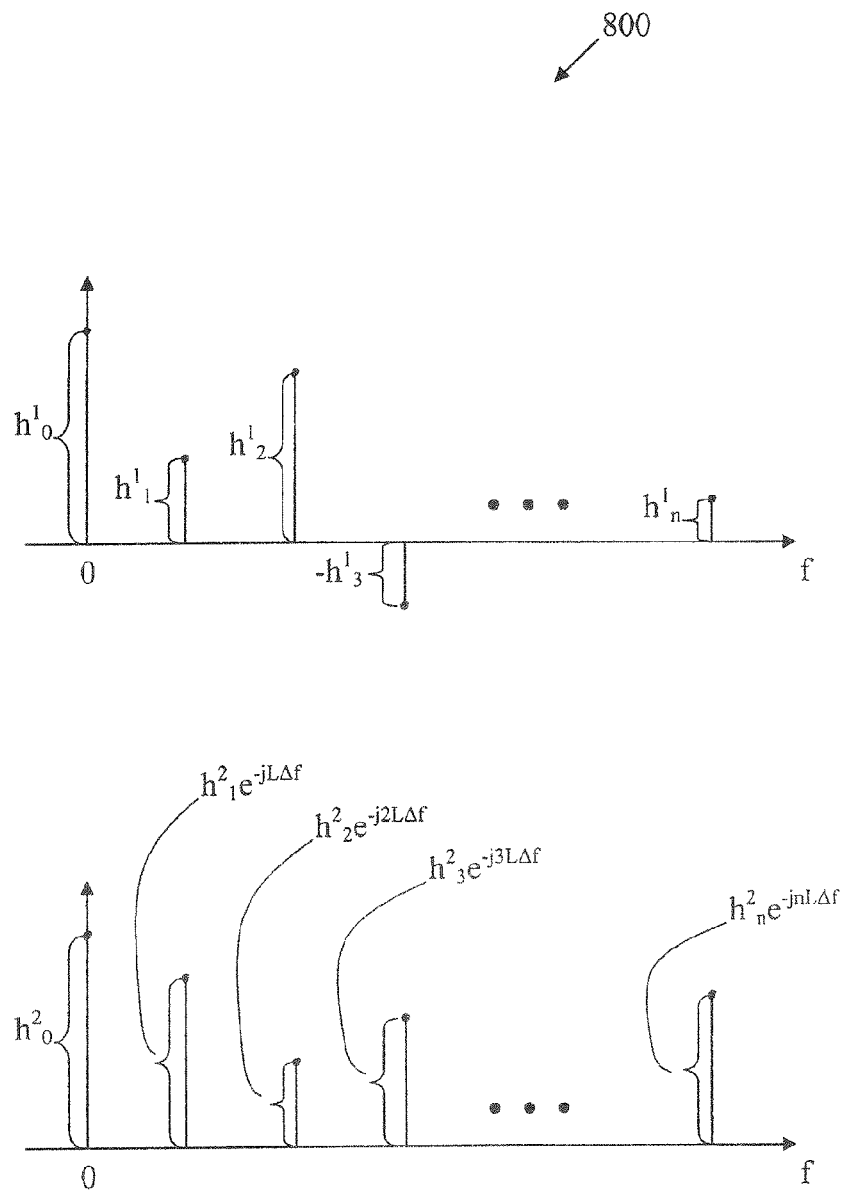
FIG. 8 illustrates a frequency response corresponding to the cyclic shifting operation illustrated in FIG. 7 according to an embodiment of the present invention.

FIG. 8 illustrates a frequency response 800 corresponding to the cyclic shifting operation illustrated in FIG. 7 according to an embodiment of the present invention. The cyclic shifting operation can be represented by the following Fourier transform:

$$S_{m-L} \rightarrow S_m \cdot e^{-jLm\Delta f} \quad \text{(Equation 2)}$$

where m=0, ..., n. The variable n represents one less than the total number of channel coefficients $h_0$-$h_n$ associated with the cyclic shifting operation. In FIG. 8, the cyclic shifting operation is represented by the Fourier transform for illustrative purposes only. Persons skilled in the relevant art(s) will recognize that the cyclic shifting operation may be performed using any of a variety of transforms.

As shown in Equation 2, a time shift in the time domain translates to a phase shift in the frequency domain. Thus, legacy receiver 120 can process samples $s_0$-$s_n$ that have been cyclically shifted by using a time domain technique, a frequency domain technique, or a combination thereof.

Referring to frequency response 800 in FIG. 8, legacy receiver 120 combines corresponding channel coefficients $h^1_0$-$h^1_n$ and $h^2_0$-$h^2_n e^{-jnL\Delta f}$ to provide combined channel coefficients $h^*_0$-$h^*_n$. With further reference to frame 200 in FIG. 2, legacy receiver 120 combines channel coefficients corresponding to preamble samples $P_0$-$P_n$ to determine the channel via which preamble samples $P_0$-$P_n$ are received. However, legacy receiver 120 does not receive preamble samples $P_0$-$P_n$ via a single channel. Instead, legacy receiver 120 receives a first version of preamble samples $P_0$-$P_n$ via channel 130a and a time-shifted version of preamble samples $P_0$-$P_n$ via channel 130b. Legacy receiver 120 estimates the channel to be a combination of channels 130a-b, based on combined channel coefficients $h^*_0$-$h^*_n$. Thus, legacy receiver estimates the channel as if the first version of preamble samples $P_0$-$P_n$ and the time-shifted version of preamble samples $P_0$-$P_n$ are received via a single channel.

After estimating the channel based on the combined channel coefficients corresponding to preamble samples $P_0$-$P_n$, legacy receiver 120 combines channel coefficients of a first version of data samples $D_0$-$D_n$ received via channel 110a and a time-shifted version of data samples $D_0$-$D_n$ received via channel 110b. Legacy receiver 120 is thereby capable of processing the first version and time-shifted version of data samples $D_0$-$D_n$ as though they are received via the single channel estimated by legacy receiver 120.

A channel coefficient of a data sample transmitted by transmitter 110a can be represented as $h^1_m$. As shown in Equation 2, a channel coefficient of a corresponding time shifted data sample transmitted by transmitter 110b can be represented as $h^2_m \cdot e^{-jLm\Delta f}$, where Δf is the phase shift in the frequency domain that corresponds to the time shift in the time domain. The combined channel coefficient $h^*_m$ for each data sample $D_0$-$D_n$ can be represented by the following equation:

$$h^*_m = h^1_m + h^2_m \cdot e^{-jLm\Delta f} \quad \text{(Equation 3)}$$

where m represents the data sample $D_0$-$D_n$ with which the combined channel coefficient is associated. The mathematical relationship between data samples $D_0$-$D_n$ received from transmitters 110a and 110b is the same as the mathematical relationship between preamble samples $P_0$-$P_n$ received from transmitters 110a and 110b. Legacy receiver 120 is therefore capable of decoding data samples $D_0$-$D_n$ received from transmitters 110a and 110b based on the estimated channel.

The composite signal $h^* \cdot S$ received by legacy receiver 120 can be represented as follows:

$$h^* \cdot S = \sum_{m=0}^{n} h^*_m \cdot S_m = \sum_{m=0}^{n} [h^1_m + h^2_m \cdot e^{-jLm\Delta f}] \cdot S_m \quad \text{(Equation 4)}$$

According to an embodiment, if one of $h^1_m$ or $h^2_m$ is small, the other of $h^1_m$ or $h^2_m$ is likely to be large enough such that legacy receiver 120 can accurately process the combined channel coefficient $h^*_m$.

Figure 9:
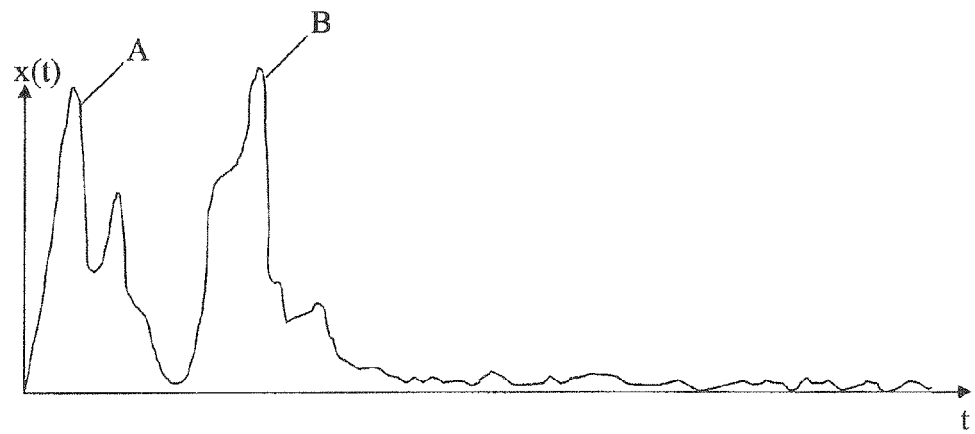
FIG. 9 is a graphical representation of diversity in the time domain according to an embodiment of the present invention.
Figure 9:
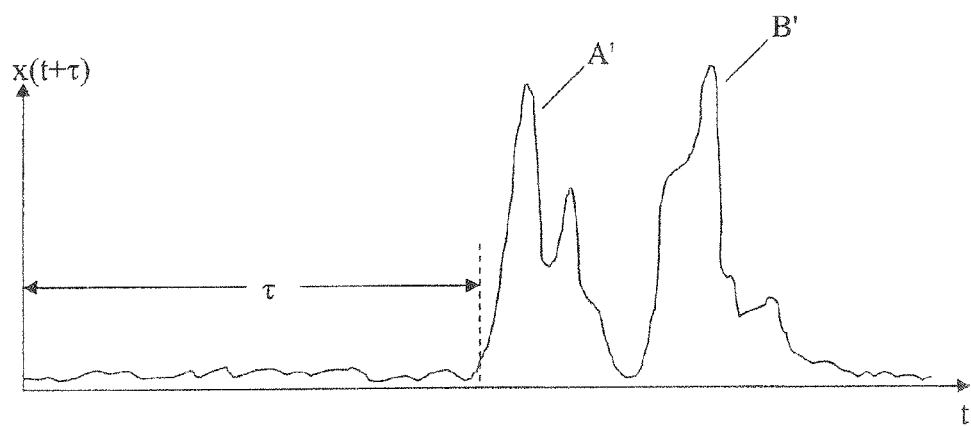
Figure 9:
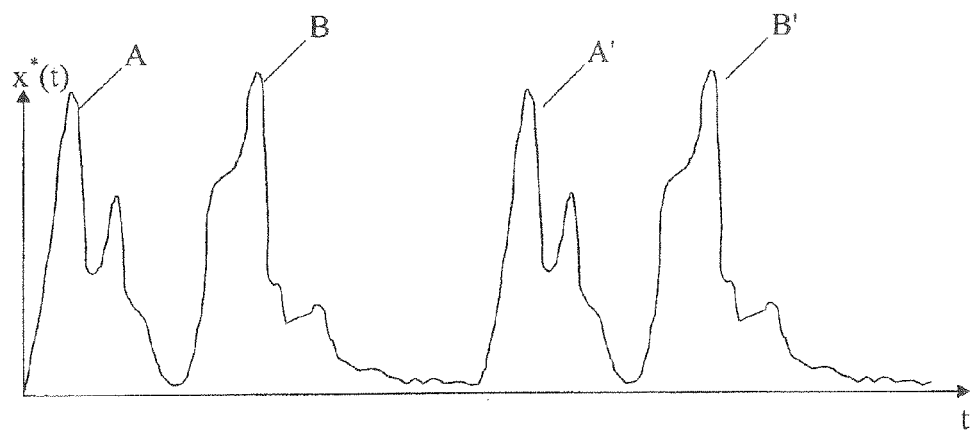

FIG. 9 is a graphical representation of diversity in the time domain according to an embodiment of the present invention. FIG. 9 shows three plots. The first plot, x(t), represents a symbol in the time domain. The second plot, x(t+τ), represents the symbol time-shifted by a period of time, τ. The third plot, x*(t), represents the combination of the symbol, x(t), and the time-shifted symbol, x(t+τ).

Referring to FIG. 9, the transmitter 110a transmits signal x(t) having peak A and peak B. Transmitter 110b transmits signal x(t+τ) having peak A' and peak B' corresponding to respective peaks A and B of signal x(t). Legacy receiver 120 combines signals x(t) and x(t+τ) to provide the combined signal x*(t), which can be represented by the following equation:

$$x^*(t) = x(t) + x(t+\tau) \quad \text{(Equation 5)}$$

In FIG. 9, the combined signal x*(t) includes peaks A, B, A', and B'. Thus, the combined signal has greater diversity than signal x(t) or signal x(t+τ) alone.

With respect to frequency domain channel determination/estimation techniques, the channel estimation capabilities of legacy receiver 120 are independent of the symbol delay L. However, legacy receiver 120 may not be capable of determining/estimating the channel using a time domain technique if the symbol delay L exceeds a threshold associated with legacy receiver 120. To illustrate this point, FIG. 10 shows a symbol delay exceeding an example threshold of legacy receiver 120 according to an embodiment of the present invention.

Figure 10:
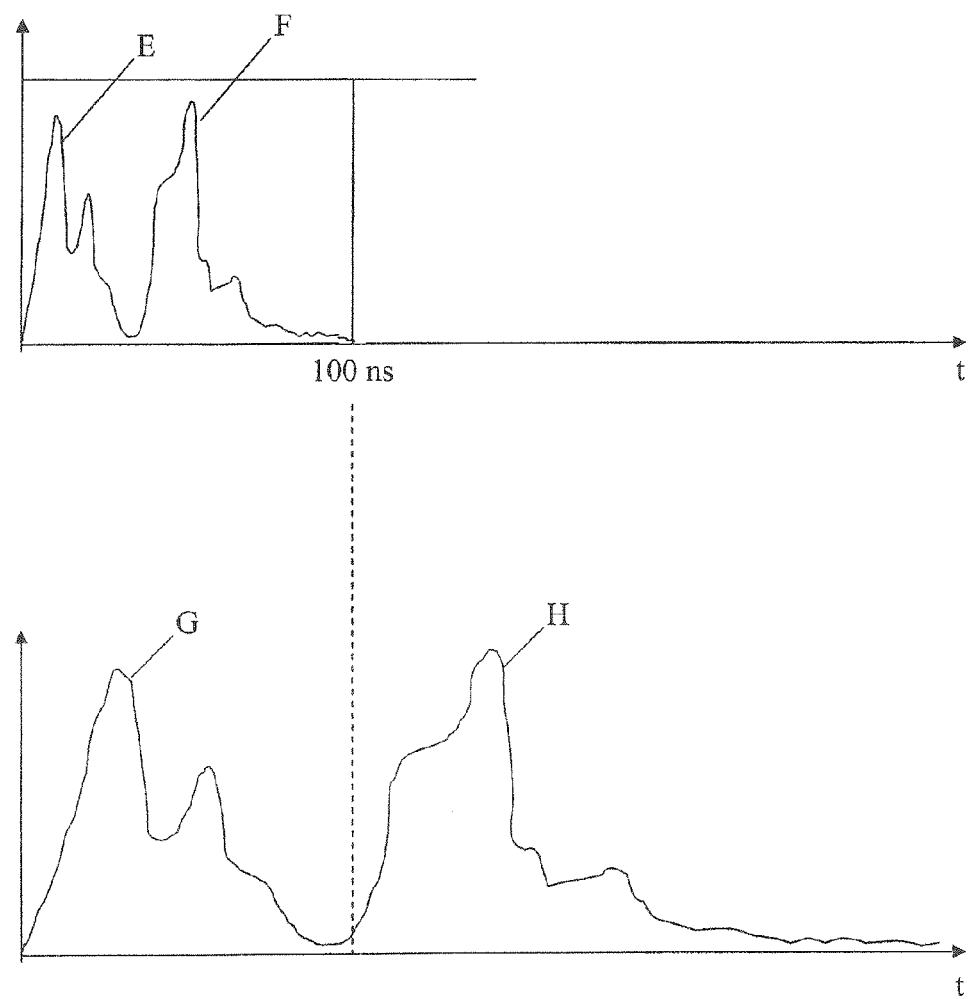
FIG. 10 illustrates a symbol delay exceeding an example threshold beyond which the legacy receiver shown in FIG. 1 will not receive the data correctly, according to an embodiment of the present invention.

In the embodiment of FIG. 10, legacy receiver 120 has a threshold of 100 ns for illustrative purposes. Thus, legacy receiver 120 can accurately estimate the channel using a time domain technique, so long as the channel does not exceed 100 ns. However, the scope of the present invention is not limited to the embodiment of FIG. 10. Different receivers can have different capabilities, and legacy receiver 120 can have any suitable threshold.

In the first plot of FIG. 10, legacy receiver 120 is capable of accurately estimating the channel, because the channel does not exceed 100 ns. However, in the second plot of FIG. 10, the channel is expanded using a time domain channel determination technique. Legacy receiver 120 is not capable of estimating the expanded channel in the second plot because the expanded channel exceeds 100 ns. In the embodiment of FIG. 10, the delay employed by the time domain channel determination technique expands the channel beyond the capabilities of the receiver.

According to an embodiment, the symbol delay L that is applied to a signal transmitted by transmitter 110b is variable. In another embodiment, the symbol delay L is determined on a receiver-by-receiver basis. The symbol delay L can be determined based on an algorithm using a high layer of transmitter 110b, such as the MAC layer.

Figure 11:
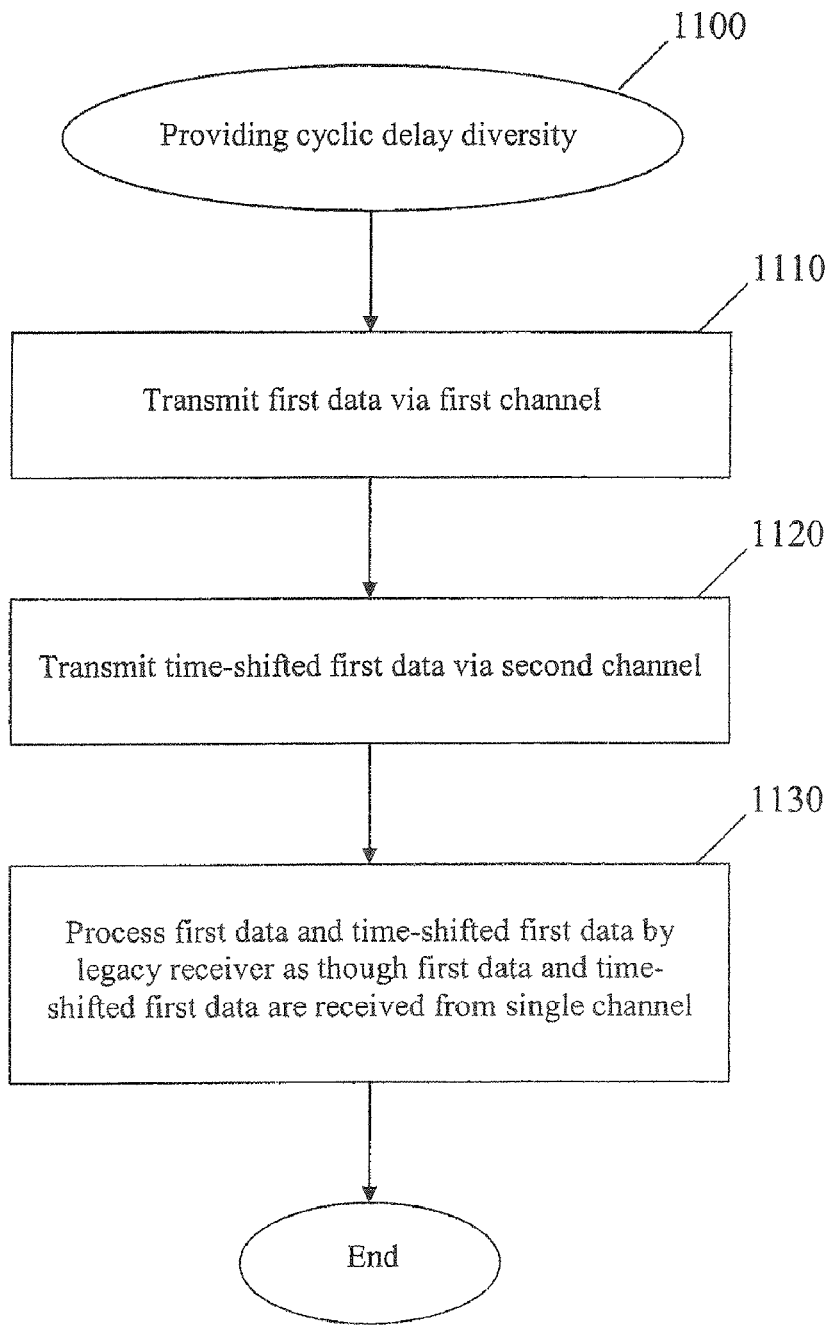
FIG. 11 illustrates a flow chart of a method of providing cyclic delay diversity according to an embodiment of the present invention.

FIG. 11 illustrates a flowchart of a method of providing cyclic delay diversity according to an embodiment of the present invention. The invention, however, is not limited to the description provided by the flowchart 1100. Rather, it will be apparent to persons skilled in the relevant art(s) from the teachings provided herein that other functional flows are within the scope and spirit of the present invention.

Flowchart 1100 will be described with continued reference to example system 100 described above in reference to FIG. 1. The invention, however, is not limited to this embodiment.

Referring now to FIG. 11, transmitter 110a transmits first data via first channel 130a at block 1110. Transmitter 110b transmits time-shifted first data via second channel 130b at block 1120. Legacy receiver 120 processes the first data and the time-shifted first data at block 1130 as though the first data and the time-shifted first data are received via a single channel. First data can be a frame, a data portion of a frame, a preamble portion of a frame, a symbol (e.g., an orthogonal frequency division multiplexing symbol), or any other suitable grouping of information.

According to an embodiment, a time delay associated with the time-shifted first data is programmable. For example, transmitter 110b can determine or select the time delay based on a model number or a predetermined threshold associated with legacy receiver 120. In another example, transmitter 110b iteratively sets the time delay until legacy receiver 120 indicates proper receipt of information having the time delay.

In an embodiment, legacy receiver 120 determines the single channel based on second data received via channel 130a and second time-shifted data received via channel 130b.

For example, the first data can be a data portion of an orthogonal frequency division multiplexing (OFDM) frame, and the second data can be a preamble portion of the OFDM frame.

Figure 12:
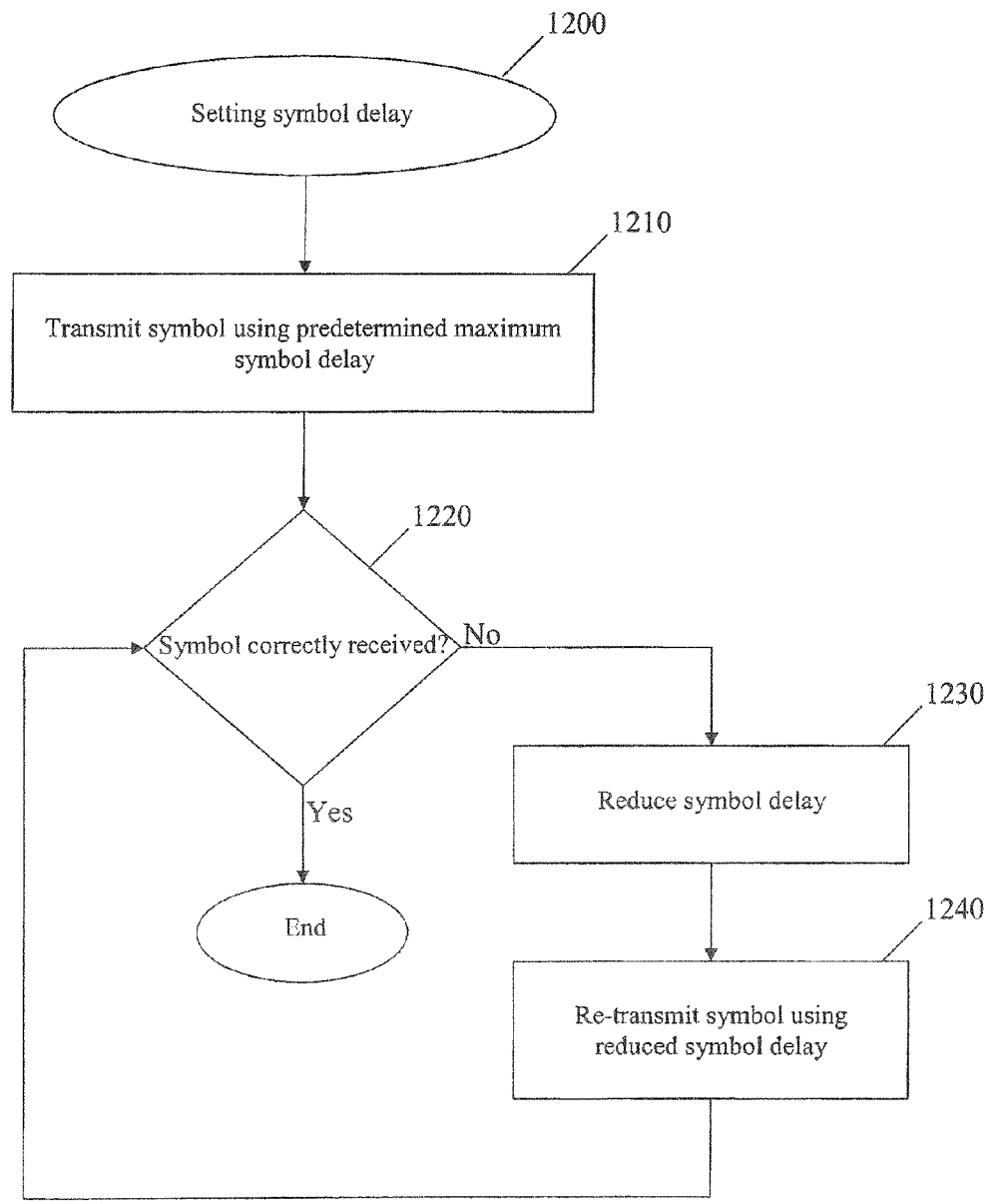
FIG. 12 illustrates a flow chart of a method of setting symbol delay according to an embodiment of the present invention.

FIG. 12 illustrates a flowchart of a method of setting symbol delay according to an embodiment of the present invention. The invention, however, is not limited to the description provided by the flowchart 1200. Rather, it will be apparent to persons skilled in the relevant art(s) from the teachings provided herein that other functional flows are within the scope and spirit of the present invention.

Flowchart 1200 will be described with continued reference to example system 100 described above in reference to FIG. 1. The invention, however, is not limited to this embodiment.

Referring now to FIG. 12, transmitter 110b transmits a symbol using a predetermined maximum symbol delay, $L_{max}$, at block 1210. If legacy receiver 120 correctly receives the symbol (i.e., correctly determines/estimates the channel via which the symbol is transmitted), as determined at decision block 1220, then the data portion of the frame will also be received without error, in the absence of other impairments. Transmitter 110b is notified of the correct data reception, for example via a positive acknowledgement, and the flow ends. If legacy receiver 120 does not correctly receive the symbol (i.e., does not correctly determine/estimate the channel), then the data portion of the frame is received in error. Transmitter 110b is notified of the error, for example via the absence of a positive acknowledgement, and reduces the symbol delay at block 1230. Transmitter 110b re-transmits the symbol using the reduced symbol delay at block 1240. Control returns to decision block 1220, in which a determination is made as to whether legacy receiver 120 correctly receives the symbol, which in the absence of other impairments is equivalent to estimating the channel correctly. Transmitter 110b continues to reduce the symbol delay at block 1230 and re-transmit the symbol using the reduced symbol delay at block 1240 until legacy receiver 120 correctly receives the symbol, as determined at decision block 1220. According to an embodiment, transmitter 110b may reduce the symbol delay at a MAC layer of transmitter 110b. For example, the MAC layer may control the number of re-transmissions.

Utilizing cyclic delay diversity provides many benefits, as compared to conventional wireless systems. For example, cyclic delay diversity can reduce or eliminate the cancellation of energy (i.e., nulls) often encountered when transmitting the same data from multiple transmitters.

4.0 Other Embodiments

FIGS. 1-12 are conceptual illustrations allowing an easy explanation of cyclic delay diversity. These figures and corresponding exemplary embodiments are described above with reference to a system that includes two transmitters for illustrative purposes and are not intended to limit the scope of the present invention. It will be recognized by persons skilled in the relevant art(s) that the techniques described herein are applicable to systems having any number of transmitters (e.g., three, four, five, etc.). For instance, a receiver may be configured to process data received via any number of channels from respective transmitters as though the data is received via a single channel.

It will be further recognized that embodiments of the present invention may be implemented using hardware, firmware, software, or any combination thereof. In such an embodiment, the various components and steps are implemented using hardware, firmware, and/or software to perform the functions of the present invention. That is, the same piece of hardware, firmware, or module of software could perform one or more of the illustrated blocks (i.e., components or steps).

In this document, the terms "computer program medium" and "computer usable medium" are used to generally refer to media such as a removable storage unit, a hard disk installed in hard disk drive, and signals (i.e., electronic, electromagnetic, optical, or other types of signals capable of being received by a communications interface). These computer program products are means for providing software to a computer system. The invention, in an embodiment, is directed to such computer program products.

In an embodiment where aspects of the present invention are implemented in software, the software may be stored in a computer program product and loaded into computer system using a removable storage drive, hard drive, or communications interface. The control logic (software), when executed by a processor, causes the processor to perform the functions of the invention as described herein.

In another embodiment, aspects of the present invention are implemented primarily in hardware using, for example, hardware components such as application specific integrated circuits (ASICs). Implementation of the hardware state machine so as to perform the functions described herein will be apparent to one skilled in the relevant art(s).

In yet another embodiment, the invention is implemented using a combination of both hardware and software.

Any of a variety of transmit modes may benefit from cyclic delay diversity, including those that need to use only one transmit chain. Some exemplary transmit modes include, but are not limited to, an Institute of Electrical and Electronics Engineers (IEEE) 802.11a standard, an IEEE 802.11b standard, an IEEE 802.11g standard, and an IEEE 802.11n standard.

5.0 Conclusion

Example embodiments of the methods, systems, and components of the present invention have been described herein. As noted elsewhere, these example embodiments have been described for illustrative purposes only, and are not limiting. Other embodiments are possible and are covered by the invention. Such other embodiments will be apparent to persons skilled in the relevant art(s) based on the teachings contained herein. Thus, the breadth and scope of the present invention should not be limited by any of the above described exemplary embodiments, but should be defined only in accordance with the following claims and their equivalents.

What is claimed is:

1. A receiver configured to:
receive data and a time-shifted version of the data;
combine channel coefficients of a preamble of a frame of the data with channel coefficients of a preamble of a frame of the time-shifted version of the data;
estimate a single channel for the data and the time-shifted version of the data; and
process, based on the estimated single channel, the data and the time-shifted version of the data as though the data and the time-shifted version of the data are received via the single channel.

2. The receiver of claim 1, wherein the receiver is further configured to:
receive at least one additional time-shifted version of data; and
process, using the additional time-shifted version of data, the data and the time-shifted version of the data as though the data and the time-shifted version of the data are received via a single channel.

3. The receiver of claim 2, wherein the data is a data portion of an orthogonal frequency division multiplexing (OFDM) frame, and wherein the additional time-shifted version of data is a preamble portion of the OFDM frame.

4. The receiver of claim 1, wherein the receiver is further configured to process the data using an error minimization algorithm.

5. The receiver of claim 1, wherein the data and the time-shifted version of the data are in accordance with at least one of: an Institute of Electrical and Electronics Engineers (IEEE) 802.11a standard, an IEEE 802.11b standard, or an IEEE 802.11g standard.

6. A method, comprising:
receiving data on a first channel;
receiving a time-shifted version of the data on a second channel;
combining channel coefficients, of a preamble of a frame of the data with channel coefficients of a preamble of a frame of the time-shifted version of the data;
estimating a single channel for the data and the time-shifted version of the data; and
processing, based on the estimated single channel, the data and the time-shifted version of the data as though the data and the time-shifted version of the data are received via a single channel.

7. The method of claim 6, further comprising:
receiving at least one additional time-shifted version of data; and
processing, using the additional time-shifted version of data, the data and the time-shifted version of the data as though the data and the time-shifted version of the data are received via a single channel.

8. The method of claim 7, wherein the data is a data portion of an orthogonal frequency division multiplexing (OFDM) frame, and wherein the additional time-shifted version of data is a preamble portion of the OFDM frame.

9. The method of claim 6, wherein the processing step comprises performing an error minimization algorithm.

10. The method of claim 6, wherein the data and the time-shifted version of the data are in accordance with at least one of: an Institute of Electrical and Electronics Engineers (IEEE) 802.11a standard, an IEEE 802.11b standard, or an IEEE 802.11g standard.

11. The receiver of claim 1, wherein the receiver is configured to indicate proper receipt of the time-shifted version of the data in response to a determination that the channel was successfully estimated.

12. The receiver of claim 11, wherein the receiver is further configured to receive a retransmission of the time-shifted version of the data until the receiver successfully estimates the channel, and wherein a symbol delay of the time-shifted version of the data is reduced until the receiver successfully estimates the channel.

13. The receiver of claim 1, wherein the time-shifted version of the data is time-shifted based on a model of the receiver, and wherein the receiver is further configured to transmit delay information corresponding to the model.

14. A receiver configured to:
receive first data via a first channel and second data via a second channel, wherein the second data is a time-shifted version of the first data;
combine channel coefficients of a preamble of a frame of the first data with channel coefficients of a preamble of a frame of the second data;

perform channel estimation using the combined channel coefficients; and combine channel coefficients of a data portion of the frame of the first data with channel coefficients of a data potion of the frame of the second data.

15. The receiver of claim 14, wherein the receiver is further configured to send a notification that the second data was properly received in response to a determination that the channel estimation was successfully performed.

16. The receiver of claim 15, wherein the receiver is further configured to receive a retransmission of the second data until the receiver successfully performs the channel estimation, wherein a symbol delay of the second data is reduced until the receiver successfully performs the channel estimation.

17. The receiver of claim 14, wherein the second data is time-shifted based on a model of the receiver, and wherein the receiver is configured to transmit delay information corresponding, to the model.

18. The receiver of claim 14, wherein the receiver is further configured to receive third data via the first channel and fourth data via the second channel, wherein the third data is the preamble of the frame of the first data, wherein the fourth data is a time shifted version of the preamble of the frame of the first data, and wherein the first data is the data portion of the frame of the first data.

* * * * *